(12) United States Patent
Tu et al.

(10) Patent No.: US 10,901,934 B2
(45) Date of Patent: Jan. 26, 2021

(54) USB INTEGRATED CIRCUIT

(71) Applicant: VIA LABS, INC., New Taipei (TW)

(72) Inventors: Chia-Ming Tu, New Taipei (TW); Hsiao-Chyi Lin, New Taipei (TW)

(73) Assignee: VIA LABS, INC., New Taipei (TW)

(*) Notice: Subject to any disclaimer, the term of this patent is extended or adjusted under 35 U.S.C. 154(b) by 0 days.

(21) Appl. No.: 16/452,564

(22) Filed: Jun. 26, 2019

(65) Prior Publication Data

US 2020/0311009 A1  Oct. 1, 2020

(30) Foreign Application Priority Data

Mar. 28, 2019 (TW) ............................... 108110906 A

(51) Int. Cl.
*G06F 13/42* (2006.01)
*G06F 13/40* (2006.01)

(52) U.S. Cl.
CPC .. *G06F 13/4282* (2013.01); *G06F 2213/0042* (2013.01)

(58) Field of Classification Search
CPC ..... G06F 13/36; G06F 13/409; G06F 13/4045
See application file for complete search history.

(56) References Cited

U.S. PATENT DOCUMENTS

| | | | | |
|---|---|---|---|---|
| 6,618,782 B1* | 9/2003 | Gulick | ................... | G06F 13/36 710/305 |
| 9,522,005 B2* | 12/2016 | Williams | ............. | A61B 17/115 |
| 2003/0200475 A1* | 10/2003 | Komoto | .............. | G06F 13/4072 713/400 |
| 2007/0055812 A1* | 3/2007 | Komatsu | ............... | G06F 13/409 711/100 |

(Continued)

FOREIGN PATENT DOCUMENTS

| | | |
|---|---|---|
| CN | 201126572 | 10/2008 |
| CN | 201216005 | 4/2009 |

(Continued)

OTHER PUBLICATIONS

"Office Action of Taiwan Counterpart Application," dated Dec. 24, 2019, p. 1-p. 16.

(Continued)

*Primary Examiner* — Getente A Yimer
(74) *Attorney, Agent, or Firm* — JCIPRNET

(57) ABSTRACT

A USB integrated circuit (IC) includes a first USB port and a second USB port. The first USB port includes a first connecting component pair and a second connecting component pair. The second USB port includes a third connecting component pair and a fourth connecting component pair. The USB IC outputs a first differential signal pair and a third differential signal pair to the outside via the first connecting component pair and the third connecting component pair, and receives a second differential signal pair and a fourth differential signal pair from the outside via the second connecting component pair and the fourth connecting component pair. The first connecting component pair is disposed between the second connecting component pair and the third connecting component pair, and the third connecting component pair is disposed between the first connecting component pair and the fourth connecting component pair.

20 Claims, 4 Drawing Sheets

(56) References Cited

U.S. PATENT DOCUMENTS

| | | | |
|---|---|---|---|
| 2009/0006699 A1 | 1/2009 | Rofougaran | |
| 2012/0102255 A1 | 4/2012 | Moore | |
| 2014/0075070 A1* | 3/2014 | Fu | G06F 13/4045 |
| | | | 710/106 |
| 2016/0112711 A1* | 4/2016 | Hundal | G06F 13/4282 |
| | | | 375/240.26 |

FOREIGN PATENT DOCUMENTS

| | | |
|---|---|---|
| CN | 203038282 | 7/2013 |
| CN | 103577366 | 2/2014 |
| CN | 104391817 | 3/2015 |
| CN | 105027019 | 11/2015 |
| CN | 204856476 | 12/2015 |
| CN | 206489560 | 9/2017 |
| CN | 207397268 | 5/2018 |
| TW | 201122793 | 7/2011 |
| TW | 201205297 | 2/2012 |
| TW | 201612763 | 4/2016 |
| TW | I536776 | 6/2016 |
| TW | 201828076 | 8/2018 |

OTHER PUBLICATIONS

"Office Action of China Counterpart Application", dated Aug. 4, 2020, p. 1-p. 9.

* cited by examiner

USB INTEGRATED CIRCUIT

CROSS-REFERENCE TO RELATED APPLICATION

This application claims the priority benefit of Taiwan application serial no. 108110906, filed on Mar. 28, 2019. The entirety of the above-mentioned patent application is hereby incorporated by reference herein and made a part of this specification.

BACKGROUND

Technical Field

The disclosure relates to an electronic circuit, and in particular to a universal serial bus (USB) integrated circuit.

Description of Related Art

USB is a standard for connecting a computer system and an external device. A USB 3.2 may increase a transmission speed to 20 Gbps, and a USB 4.0 may increase a transmission speed to 40 Gbps. The transmission speeds of the USB 3.2 and the USB 4.0 are increased because a usage mode of a USB 3.1 Type-C connector is improved and the transmission speed is sped up. A USB Type-C connector has two sets of data transmission ports, so that the connector may smoothly insert into a connecting port regardless of front or back sides. In addition to preserving the feature, the USB 3.2 and the USB 4.0 may also make the two sets of transmission ports operate simultaneously. Therefore, compared to a USB 3.1 Gen1 version, the USB 3.2 may double a flow of the data transmission, and the USB 4.0 may increase the flow of the data transmission by eight times. As long as a host and a device support the USB 3.2 and the USB 4.0, a user may enjoy the transmission speed of 20 Gbps or 40 Gbps. However, if one of the ends is USB 2.0, USB 3.1 Gen1 or USB 3.1 Gen2, or, when one end supports the USB 4.0 and the other end supports the USB 3.2, or if a Type-C terminal is converted into a Type-A terminal via an adaptor, the device may still operate normally in a lower speed though an advantage of high speed transmission may be lost.

It should be noted that the content in the paragraph of "Description of Related Art" is used to help make the disclosure understood. Parts of the content (or the whole content) disclosed by the paragraphs of "Description of Related Art" may not be prior arts known by persons skilled in the art. The content disclosed by the paragraphs of "Description of Related Art" does not mean that the content has been known by persons skilled in the art before an application of the disclosure.

SUMMARY

The disclosure provides a USB integrated circuit (IC) to provide a transmission port of high cost-effective planning.

An embodiment of the disclosure provides a USB IC. The USB IC includes a first USB port and a second USB port. The first USB port includes a first connecting component pair and a second connecting component pair. The USB IC is disposed to output a first differential signal pair to outside via the first connecting component pair, and to receive a second differential signal pair from outside via the second connecting component pair. The second USB port includes a third connecting component pair and a fourth connecting component pair. The USB IC is disposed to output a third differential signal pair to outside via a third connecting component pair, and receive a fourth differential signal pair from outside via a fourth connecting component pair. The first connecting component pair is disposed between the second connecting component pair and the third connecting component pair, and the third connecting component pair is disposed between the first connecting component pair and the fourth connecting component pair.

An embodiment of the disclosure provides a USB IC. The USB IC includes a first USB port physical layer (abbreviated as PHY in the following content) circuit and a second USB port PHY circuit. The first USB port PHY circuit includes a first transmitter PHY circuit and a first receiver PHY circuit. The USB IC is disposed to transmit the first differential signal pair to outside via the first transmitter PHY circuit, and to receive the second differential signal pair from outside via the first receiver PHY circuit. The second USB port PHY circuit includes a second transmitter PHY circuit and a second receiver PHY circuit. The USB IC is disposed to output the third differential signal pair to outside via the second transmitter PHY circuit, and to receive the fourth differential signal pair from outside via the second receiver PHY circuit. A layout of the first transmitter PHY circuit is disposed between a layout of the first receiver PHY circuit and a layout of the second receiver PHY circuit, and the layout of the second transmitter PHY circuit is disposed between the layout of the first transmitter PHY circuit and a layout of the second receiver PHY circuit.

An embodiment of the disclosure provides a USB IC. The USB IC includes a source clock generating circuit, a first frequency adjusting circuit, a second frequency adjusting circuit, the first USB port PHY circuit and the second USB port PHY circuit. The source clock generating circuit is disposed to generate a source clock signal. The first frequency adjusting circuit is coupled to the source clock generating circuit to receive the source clock signal. The first frequency adjusting circuit is disposed to optionally adjust a frequency of the source clock signal to generate a first clock signal. The second frequency adjusting circuit is coupled to the source clock generating circuit to receive the source clock signal. The second frequency adjusting circuit is disposed to optionally adjust the frequency of the source clock signal to generate a second clock signal. The first USB port PHY circuit includes the first transmitter PHY circuit and the first receiver PHY circuit. The first receiver PHY circuit is coupled to the first frequency adjusting circuit to receive the first clock signal. The USB IC is disposed to output the first differential signal pair to outside via the first transmitter PHY circuit, and to receive the second differential signal pair from outside via the first receiver PHY circuit. The second USB port PHY circuit includes the second transmitter PHY circuit and the second receiver PHY circuit. The second transmitter PHY circuit is coupled to the second frequency adjusting circuit to receive the second clock signal. The USB IC is disposed to output the third differential signal pair to outside via the second transmitter PHY circuit, and to receive the fourth differential signal pair from outside via the second receiver PHY circuit.

Based on the above, in some embodiments, the USB IC has the first USB port PHY circuit (the first USB port), and the second USB port PHY circuit (the second USB port). The transmitter of the first USB port PHY circuit (the layout of the first transmitter PHY circuit or the first connecting component pair) and the transmitter of the second USB port PHY circuit (the layout of the second transmitter PHY circuit or the third connecting component pair) are disposed between the receiver of the first USB port PHY circuit (the layout of the first receiver PHY circuit or the second connecting component pair) and the receiver of the second USB port PHY circuit (the layout of the second receiver PHY circuit or the fourth connecting component pair). The USB IC may provide the transmission port of high cost-effective planning.

In order to make the features and advantages of the disclosure mentioned above more understandable, embodiments will be described in detail below with reference to the accompanying drawings.

DESCRIPTION OF THE EMBODIMENTS

Figure 1:
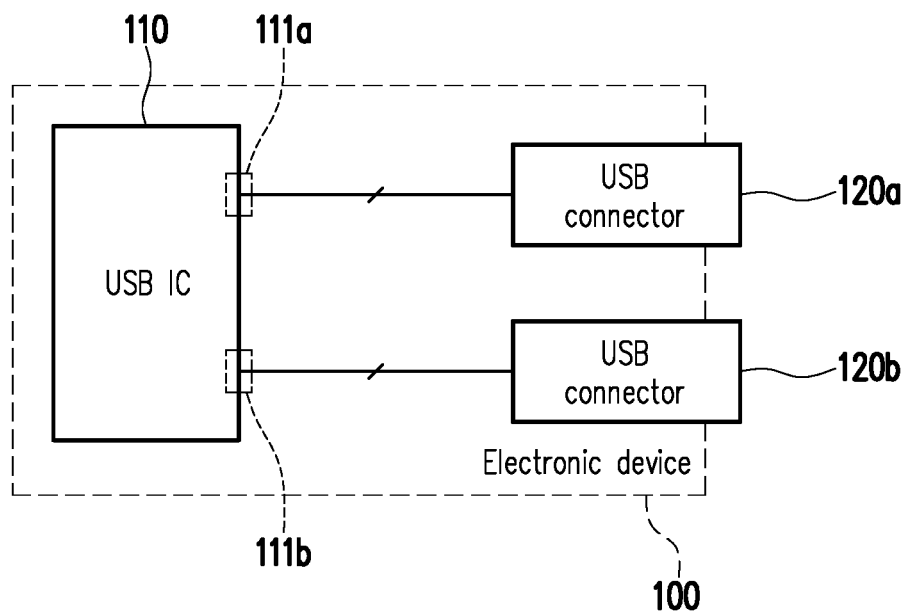
FIG. 1 is a schematic view of a circuit block of an electronic device according to an embodiment of the disclosure.

The description of "couple to (or connect to)" used in the whole content of the specification of the disclosure (including claims) may refer to any direct or indirect connecting method. For example, if the content describes that a first device is coupled to (or is connected to) a second device, it should be explained that the first device may be directly connected to the second device, or the first device may be indirectly connected to the second device through other devices or some kinds of connecting methods. Terms such as "first" and "second" mentioned in the whole content of the specification of the disclosure (include claims) are used to name titles of elements, or to distinguish different examples or scopes, but not used to limit an upper limit or a lower limit of numbers of elements, nor used to limit a sequence of the elements. In addition, whatever possible, elements/components/steps using same reference numerals in FIGS and embodiments represents same or similar parts. Elements/components/steps using same reference numerals or same terms in different embodiments may refer related description to one another.

FIG. 1 is a schematic view of a circuit block of an electronic device 100 according to an embodiment of the disclosure. According to design requirements, the electronic device 100 shown in FIG. 1 may be a host (such as a personal computer), a hub, or other electronic devices. The electronic device 100 includes a universal serial bus (USB) integrated circuit (IC) 110, a USB connector 120a and a USB connector 120b. The USB IC 110 includes at least two (two sets) USB ports. For example, in the embodiment shown in FIG. 1, the USB IC 110 includes a USB port 111a and a USB port 111b. Based on rules of USB specification, the USB port 111a includes a plurality of connecting components (the USB port 111b may be deduced by analogy). A packaging type of The USB IC 110 may be ball grid array (BGA) package, quad flat non-leaded (QFN) package, or other package forms. Based on the packaging type of the USB IC 110, each of the connecting components of the USB port 111a and the USB port 111b may be pins, solder balls or other types of connecting components.

As shown in the embodiment of FIG. 1, the USB port 111a is connected to a USB connector 120a, and the USB port 111b is connected to the other USB connector 120b. According to design requirements, the USB connector 120a may be a USB Type-A connector, a USB Type-B connector, a USB Type-C connector, or other types of USB connectors, and the USB connector 120b may be the be the USB Type-A connector, the USB Type-B connector, the USB Type-C connector, or other types of USB connectors. The USB connector 120a and USB connector 120b may be connectors that meet the USB specification; therefore, the implementing details would not be described again herein. For example, a pair of transmitter differential pins (connecting component pair) of the USB port 111a may be connected to transmission pins TX+ and TX− of the USB connector 120a, and a pair of receiver differential pins (connecting component pair) of the USB port 111a may be connected to receiving pins RX+ and RX− of the USB connector 120a; a pair of transmitter differential pins (connecting component pair) of the USB port 111b may be connected to transmission pins TX+ and TX− of the USB connector 120b, and a pair of receiver differential pins (connecting component pair) of the USB port 111b is connected to receiving pins RX+ and RX− of the USB connector 120b.

Figure 2:
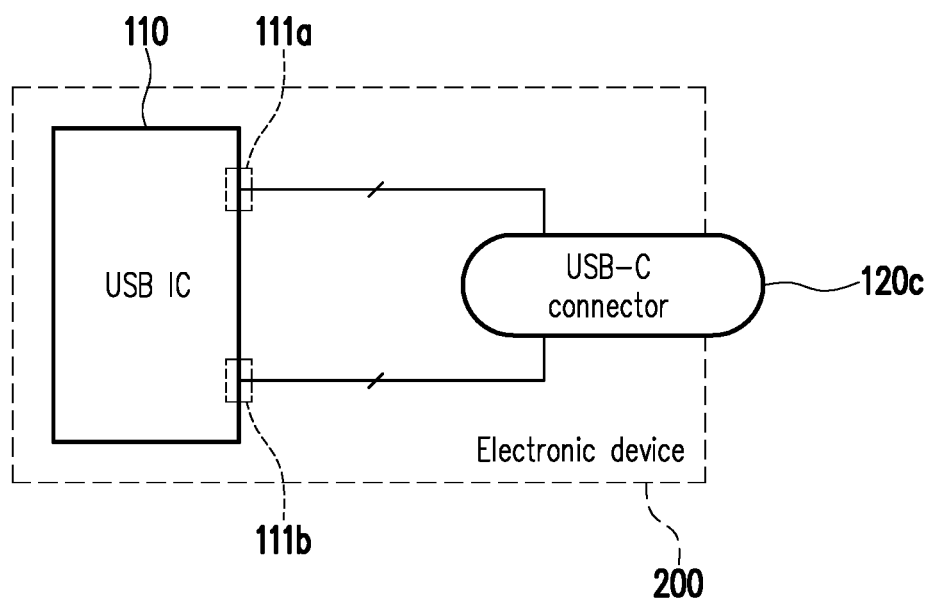
FIG. 2 is a schematic view of a circuit block of an electronic device according to another embodiment of the disclosure.

FIG. 2 is a schematic view of a circuit block of an electronic device 200 according to another embodiment of the disclosure. According to design requirements, the electronic device 200 shown in FIG. 2 may be a host, a hub, or other electronic devices. The electronic device 200 includes the USB IC 110 and a USB-C connector 120c. The USB IC 110, the USB port 111a and the USB port 111b shown in FIG. 2 may be referred to the related description of FIG. 1, and, therefore, would not be described again herein. The USB-C connector 120c may be the USB Type-C connector that meets the USB specification or other types of USB connectors; therefore, the implementing details would not be described again herein. The USB-C connector 120c has a plurality of A-side pins and a plurality of B-side pins to allow a USB connector to nondirectionally insert into the USB-C connector 120c.

In some embodiments, the USB port 111a of the USB IC 110 is connected to the A-side pin of the USB-C connector 120c, and the USB port 111b of the USB IC 110 is connected to the B-side pin of the USB-C connector 120c. For example, a pair of transmitter differential pins (connecting component pair) of the USB port 111a may be connected to transmission pins TX1+ and TX1− of the USB-C connector 120c, and a pair of receiver differential pins (connector component pair) of the USB port 111a may be connected to receiving pins RX2+ and RX2− of the USB-C connector 120c; the pair of transmitter differential pins (connecting component pair) of the USB port 111b may be connected to transmission pins TX2+ and TX2− of the USB-C connector 120c, and the pair of receiver differential pins (connecting component pair) of the USB port 111b is connected to receiving pins RX1+ and RX1− of the USB-C connector 120c.

Figure 3:
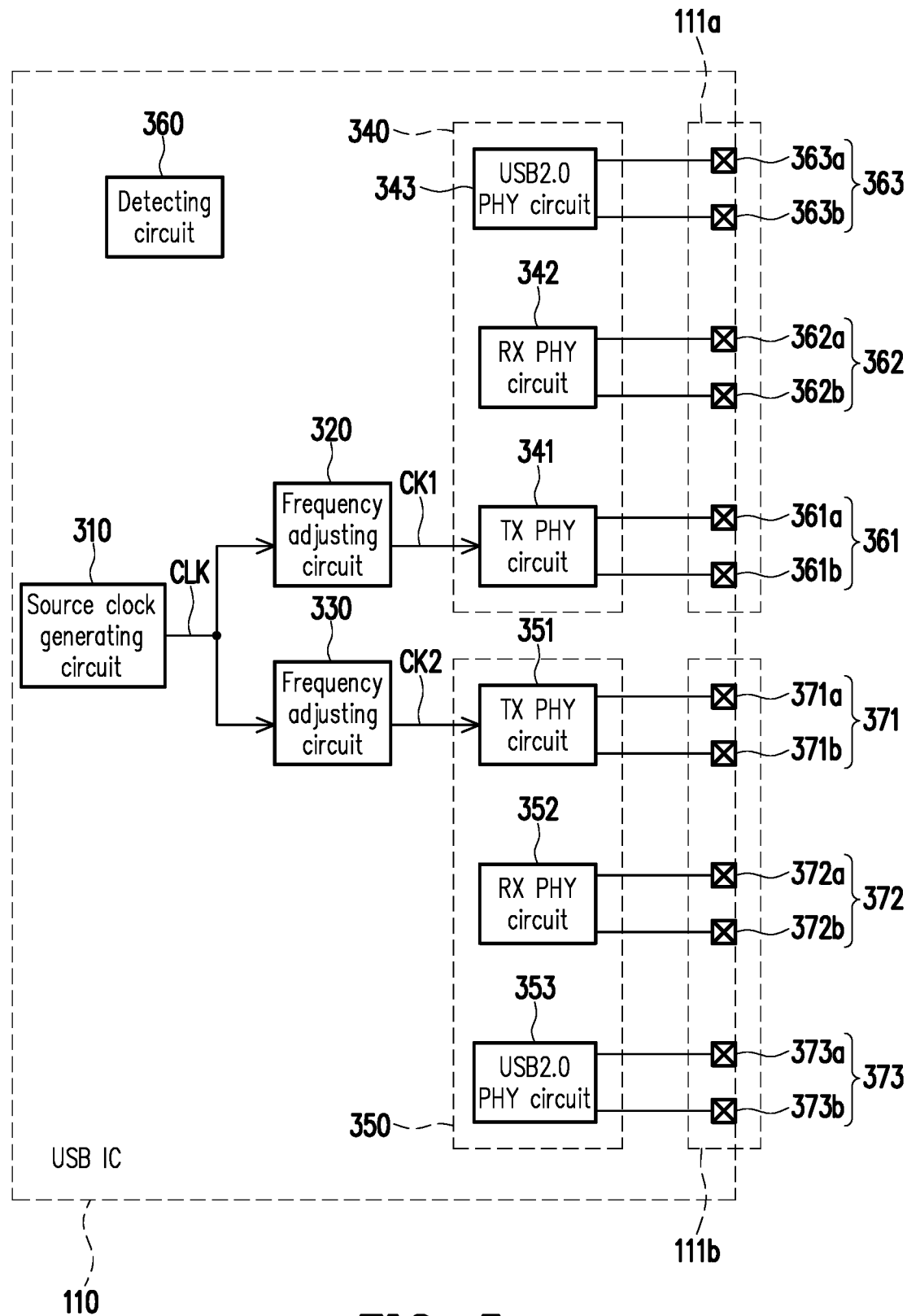
FIG. 3 is a schematic view of a circuit block of a USB IC according to an embodiment of the disclosure.

FIG. 3 is a schematic view of a circuit block of a USB IC 110 according to an embodiment of the disclosure. The USB IC 110 shown in FIG. 3 includes a source clock generating circuit 310, a frequency adjusting circuit 320, a frequency adjusting circuit 330, a USB port physical layer (abbreviated as PHY in the following content) circuit 340, a USB port PHY circuit 350, the USB port 111a and the USB port 111b. The USB IC 110, the USB port 111a and the USB port 111b shown in FIG. 3 may be referred to the related description of the USB IC 110, the USB port 111a and the USB port 111b shown in FIG. 1 and/or FIG. 2. For convenience of description, a known link layer circuit, a power circuit and/or other circuits are not shown in FIG. 3.

The source clock generating circuit 310 shown in FIG. 3 may generate a source clock signal CLK. Implementation methods of the source clock generating circuit 310 are not limited by the present embodiment. According design requirements, in some embodiments, the source clock generating circuit 310 may include a phase locked loop (PLL) and/or other clock signal generating circuits. A frequency of the source clock signal CLK are not limited by the present embodiment. According to design requirements, in some embodiments, the frequency of the source clock signal CLK may be a frequency that meets a speed specification of the USB 3.1 Gen2 (such as 10 GHz). In some other embodiments, the frequency of the source clock signal CLK may be a frequency that meets a speed specification of the USB 4.0 (such as 20 GHz). In other embodiments, the frequency of the source clock signal CLK may be other frequencies (such as frequencies that are higher than 20 GHz).

A new USB 3.2 specification has concluded a plurality of previous titles of USB. An afore-alleged USB 3.2 is an alleged USB 3.2 Gen 2×2 of the new USB 3.2 specification. An afore-alleged USB 3.1 Gen2 is an alleged USB 3.2 Gen2 of the new USB 3.2. An afore-alleged USB 3.1 Gen1 is an alleged USB 3.2 Gen1 of the new USB 3.2.

An input end of the frequency adjusting circuit 320 and an input end of the frequency adjusting circuit 330 are coupled to an output end of the source clock generating circuit 310 to receive the same source clock signal CLK. The frequency adjusting circuit 320 may optically adjust the frequency of the source clock signal CLK to generate a source clock signal CK1. A detecting mechanism of a detecting circuit 360 may detect a requirement of transmission speed of the USB port 111a. The detecting mechanism of the detecting circuit 360 may be a known USB detecting mechanism or other detecting mechanisms. Based on the requirement of transmission speed of the USB port 111a, the detecting circuit 360 may correspondingly control the frequency adjusting circuit 320 to adaptably change a frequency of the clock signal CK1. To deduce the rest by analogy, the frequency adjusting circuit 330 may optically adjust the frequency of the source clock signal CLK to generate a clock signal CK2. The detecting mechanism of the detecting circuit 360 may detect the requirement of transmission speed of the USB port 111b. Based on the requirement of transmission speed of the USB port 111b, the detecting circuit 360 may correspondingly control the frequency adjusting circuit 330 to adaptably change a frequency of the clock signal CK2.

In the embodiment shown in FIG. 3, the USB port PHY circuit 340 includes a plurality of physical layer circuits, such as a transmitter physical layer (abbreviated as TX PHY in the following content) circuit 341, a receiver physical layer (abbreviated as RX PHY in the following content) circuit 342 and a USB 2.0 physical layer (abbreviated as USB2.0 PHY) circuit 343. The TX PHY circuit 341 is coupled to the frequency adjusting circuit 320 to receive the clock signal CK1. The USB IC 110 may output a differential signal pair to outside of the USB IC 110 via the TX PHY circuit 341. The USB IC 110 may receive the differential signal pair from outside via the RX PHY circuit 342. The USB IC 110 may send and receive the differential signal pair (USB 2.0 data signal pair) via the USB2.0 PHY circuit 343. Implementing methods of the TX PHY circuit 341, the RX PHY circuit 342 and the USB2.0 PHY circuit 343 are not limited by the present embodiment. In some embodiments, the TX PHY circuit 341 may be a known TX PHY circuit or other TX PHY circuits that meet the USB specification, and the RX PHY circuit 342 may be a known RX PHY circuit or other RX PHY circuits that meet the USB specification, and the USB2.0 PHY circuit 343 may be a known physical layer circuit that meets the USB 2.0 specification. According to design requirements, in some embodiments, the USB2.0 PHY circuit 343 might be omitted.

The USB port PHY circuit 350 includes a plurality of physical layer circuits, such as a TX PHY circuit 351, a RX PHY circuit 352 and a USB2.0 PHY circuit 353. The TX PHY circuit 351 is coupled to the frequency adjusting circuit 330 to receive the clock signal CK2. The USB IC 110 may output the differential signal pair to outside of the USB IC 110 via the TX PHY circuit 351. The USB IC 110 may receive the differential signal pair from outside via the RX PHY circuit 352. The USB IC 110 may send and receive the differential signal pair (USB 2.0 data signal pair) via the USB 2.0 PHY circuit 353. Implementation methods of the TX PHY circuit 351, the RX PHY circuit 352 and the USB2.0 PHY circuit 353 are not limited by the present embodiment. In some embodiments, the TX PHY circuit 351 may be a known TX PHY circuit or other TX PHY circuits that meet the USB specification, RX PHY circuit 352 may be a known RX PHY circuit or other RX PHY circuits that meet the USB specification, and the USB2.0 PHY circuit 353 may be a known physical layer circuit that meets the USB2.0 specification. According to design requirements, in some embodiments, the USB2.0 PHY circuit 353 might be omitted.

In the embodiment shown in FIG. 3, a layout of the TX PHY circuit 341 is disposed between a layout of the RX PHY circuit 342 and a layout of the TX PHY circuit 351, and the layout of the TX PHY circuit 351 is disposed between the layout of the TX PHY circuit 341 and a layout of the RX PHY circuit 352. The layout of the TX PHY circuit 341 and the layout of the TX PHY circuit 351 are disposed between the layout of the RX PHY circuit 342 and the layout of the RX PHY circuit 352. The layout of the TX PHY circuit 341 and the layout of the RX PHY circuit 342 are disposed between a layout of the USB2.0 PHY circuit 343 and the layout of the TX PHY circuit 351. The layout of the TX PHY circuit 351 and the layout of the RX PHY circuit 352 are disposed between a layout of the USB2.0 PHY circuit 353 and the layout of the TX PHY circuit 341.

In the embodiment shown in FIG. 3, the USB port 111a includes a plurality of connecting component pairs, such as a connecting component pair 361, a connecting component pair 362 and a connecting component pair 363. The USB port 111b includes a plurality of connecting component pairs, such as a connecting component pair 371, a connecting component pair 372 and a connecting component pair 373. The connecting component pair 361 is disposed between the connecting component pair 362 and the connecting component pair 371. The connecting component pair 371 is disposed between the connecting component pair 361 and the connecting component pair 372. The connecting component pair 361 and the connecting component pair 371 are disposed between the connecting component pair 362 and the connecting component pair 372. The connecting component pair 361 and the connecting component pair 362 are disposed between the connecting component pair 363 and the connecting component pair 371. The connecting component pair 371 and the connecting component pair 372 are disposed between the connecting component pair 373 and the connecting component pair 361.

The connecting component pair 361 includes a connecting component 361a and a connecting component 361b. According to design requirements, in some embodiments, the connecting component 361a may serve as a TX+ pin of the connecting component 361, and the connecting component 361b may serve as a TX– pin of the connecting component pair 361. In other embodiments, the connecting component 361a may serve as the TX– pin of the connecting component pair 361, and the connecting component 361b may serve as the TX+ pin of the connecting component pair 361. The connecting component 361a and the connecting component 361b are coupled to a differential output end of the TX PHY circuit 341. The TX PHY circuit 341 of the USB IC 110 may output the differential signal pair to outside of the USB IC 110 via the connecting component pair 361.

The connecting component pair 362 includes a connecting component 362a and a connecting component 362b. According to design requirements, in some embodiments, the connecting component 362a may serve as a RX+ pin of the connecting component 362, and the connecting component 362b may serve as a RX– pin of the connecting component pair 362. In other embodiments, the connecting component 362a may serve as the RX– pin of the connecting component pair 362, and the connecting component 362b may serve as the RX+ pin of the connecting component pair 362. The connecting component 362a and the connecting component 362b are coupled to a differential input end of the RX PHY circuit 342. The RX PHY circuit 342 of the USB IC 110 may receive the differential signal pair from outside via the connecting component pair 362.

The connecting component pair 363 includes a connecting component 363a and a connecting component 363b. According to design requirements, in some embodiments, the connecting component 363a may serve as a D+ pin of the connecting component pair 363, and the connecting component 363b may serve as a D– pin of the connecting component pair 363. In other embodiments, the connecting component pair 363a may serve as the D– pin of the connecting component pair 363, and the connecting component 363b may serve as the D+ pin of the connecting component pair 363. The connecting component 363a and the connecting component 363b are coupled to a differential output end of the USB2.0 PHY circuit 343. The USB2.0 PHY circuit 343 of the USB IC 110 may send and receive the differential signal pair (USB 2.0 data signal pair) via the connecting component pair 363. When the USB2.0 PHY circuit 343 is omitted, the connecting component pair 363 may also be omitted correspondingly.

The connecting component pair 371 includes a connecting component 371a and a connecting component 371b. According to design requirements, in some embodiments, the connecting component 371a may serve as a TX+ pin of the connecting component pair 371, and the connecting component 371b may serve as a TX– pin of the connecting component pair 371. In other embodiments, the connecting component 371a may serve as the TX– pin of the connecting component pair 371, and the connecting component 371b may serve as the TX+ pin of the connecting component pair 371. The connecting component 371a and the connecting component 371b are coupled to a differential output end of the TX PHY circuit 351. The TX PHY circuit 351 of the USB IC 110 may output the differential signal pair to outside of the USB IC 110 via the connecting component pair 371.

The connecting component pair 372 includes a connecting component 372a and a connecting component 372b.

According to design requirements, in some embodiments, the connecting component 372a may serve as a RX+ pin of the connecting component pair 372, and the connecting component 372b may serve as a RX– pin of the connecting component pair 372. In other embodiments, the connecting component 372a may serve as the RX– pin of the connecting component pair 372, and the connecting component 372b may serve as the RX+ pin of the connecting component pair 372. The connecting component 372a and the connecting component 372b are coupled to a differential input end of the RX PHY circuit 352. The RX PHY circuit 352 of the USB IC 110 may receive the differential signal pair from outside via the connecting component pair 372.

The connecting component pair 373 includes a connecting component 373a and a connecting component 373b. According to design requirements, in some embodiments, the connecting component 373a may serve as a D+ pin of the connecting component pair 373, and the connecting component 373b may serve as a D– pin of the connecting component pair 373. In other embodiments, the connecting component 373a may serve as the D– pin of the connecting component pair 373, and the connecting component 373b may serve as the D+ pin of the connecting component pair 373. The connecting component 373a and the connecting component 373b are coupled to a differential output end of the USB2.0 PHY circuit 353. The USB2.0 PHY circuit 353 of the USB IC 110 may send and receive the differential signal pair (USB 2.0 data signal pair) via the connecting component pair 373. When the USB2.0 PHY circuit 353 is omitted, the connecting component pair 373 may also be omitted correspondingly.

Figure 4:
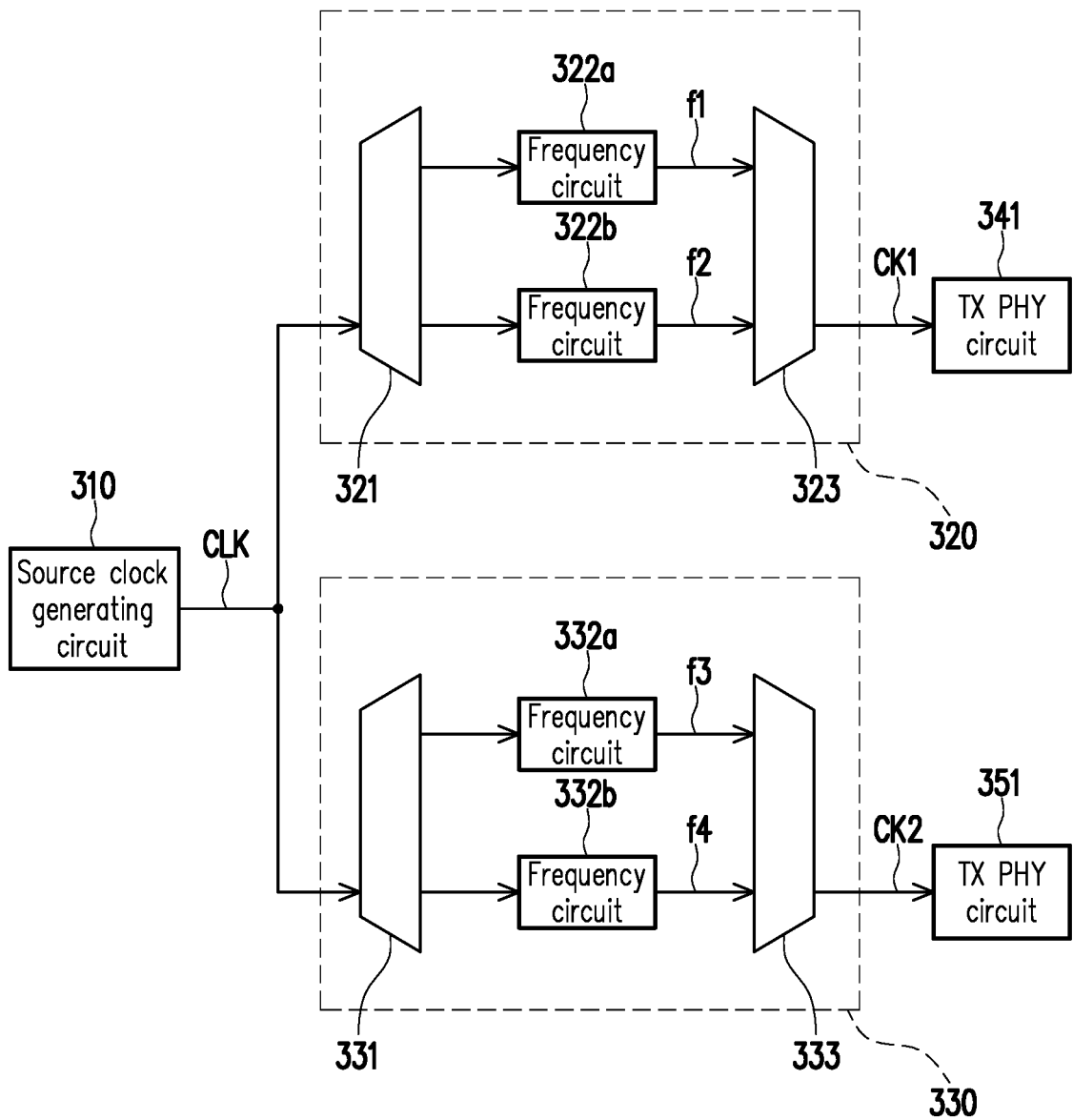
FIG. 4 is a schematic view of a circuit block of a frequency adjusting circuit according to an embodiment of the disclosure.

FIG. 4 is a schematic view of circuit blocks of a frequency adjusting circuit 320 and 330 according to an embodiment of the disclosure. The source clock generating circuit 310, the frequency adjusting circuit 320, the frequency adjusting circuit 330, the TX PHY circuit 341 and the TX PHY circuit 351 shown in FIG. 4 may be referred to the related description of the source clock generating circuit 310, the frequency adjusting circuit 320, the frequency adjusting circuit 330, the TX PHY circuit 341 and the TX PHY circuit 351 shown in FIG. 3, and, therefore, would not be described again herein.

The frequency adjusting circuit 320 shown in FIG. 4 includes a demultiplexing circuit 321, a frequency circuit 322a, a frequency circuit 322b and a multiplexing circuit 323. A common end of the demultiplexing circuit 321 is coupled to the source clock generating circuit 310 to receive the source clock signal CLK. An input end of the frequency circuit 322a is coupled to a first selection end of the demultiplexing circuit 321, so as to receive the source clock signal CLK via the demultiplexing circuit 321. An output end of the frequency circuit 322a provides the first selection end of the multiplexing circuit 323 with a frequency f1. According to design requirements, in some embodiments, the frequency f1 may be equal to the frequency of the source clock signal CLK. In some other embodiments, the frequency circuit 322a includes a frequency dividing circuit, so that the frequency f1 may be made smaller than the frequency of the source clock signal CLK. In other embodiments, the frequency circuit 322a includes a frequency multiplying circuit, so that the frequency f1 may be made greater than the frequency of the source clock signal CLK.

An input end of the frequency circuit 322b is coupled to a second selection end of the demultiplexing circuit 321, so as to receive the source clock signal CLK via the demultiplexing circuit 321. An output end of the frequency circuit 322b provides a second selection end of the multiplexing circuit 323 with a frequency f2 that is different from the frequency f1. According to design requirements, in some embodiments, the frequency circuit 322b includes the frequency dividing circuit, so that the frequency f2 may be made smaller than the frequency of the source clock signal CLK. In some other embodiments, the frequency f2 may be equal to the frequency of the source clock signal CLK. In other embodiments, the frequency circuit 322b includes the frequency multiplying circuit, so that the frequency f2 may be made greater than the frequency of the source clock signal CLK.

According to design requirements, in some embodiments, the frequency f1 meets the speed specification of the USB 4.0, and the frequency f2 may be a frequency of other USB specifications (other USB specifications that are lower than the USB 4.0) that is backward compatible (such as a frequency of the speed specification that meets the USB 3.2, the USB 3.1 Gen2 or the USB 3.1 Gen1). In some other embodiments, the frequency f1 meets the speed specification of the USB 3.2, and the frequency f2 may be a frequency of other USB specifications (other USB specifications that are lower than the USB 3.2) that is backward compatible (such as a frequency of the speed specification that meets the USB 3.1 Gen2 or the USB 3.1 Gen1). The first selection end and the second selection end of the multiplexing circuit 323 are respectively coupled to the output end of the frequency circuit 322a and the output end of the frequency circuit 322b. A common end of the multiplexing circuit 323 is coupled to the TX PHY circuit 341 to provide the clock signal CK1.

The frequency adjusting circuit 330 shown in FIG. 4 includes a demultiplexing circuit 331, a frequency circuit 332a, a frequency circuit 332b, and a multiplexing circuit 333. A common end of the demultiplexing circuit 331 is coupled to the source clock generating circuit 310 to receive the source clock signal CLK. An input end of the frequency circuit 332a is coupled to a first selection end of the demultiplexing circuit 331, so as to receive the source clock signal CLK via the demultiplexing circuit 331. The output end of the frequency circuit 332a provides a first selection end of the multiplexing circuit 333 with a frequency f3. According to design requirements, in some embodiments, the frequency f3 may be equal to the frequency of the source clock signal CLK. In some other embodiments, the frequency circuit 332a includes the frequency dividing circuit, so that the frequency f3 may be made smaller than the frequency of the source clock signal CLK. In other embodiments, the frequency circuit 332a includes the frequency multiplying circuit, so that the frequency f3 may be made greater than the frequency of the source clock signal CLK.

An input end of the frequency circuit 332b is coupled to a second selection end of the demultiplexing circuit 331, so as to receive the source clock signal CLK via the demultiplexing circuit 331. An output end of the frequency circuit 332b provides a second selection end of the multiplexing circuit 333 with a frequency f4 that is different from the frequency f3. According to design requirements, in some embodiments, the frequency circuit 332b includes the frequency dividing circuit, so that the frequency f4 may be made smaller than the frequency of the source clock signal CLK. In some other embodiments, the frequency f4 may be equal to the frequency of the source clock signal CLK. In other embodiments, the frequency circuit 332b includes the frequency multiplying circuit, so that the frequency f4 may be made greater than the frequency of the source clock signal CLK.

According to design requirements, in some embodiments, the frequency f3 meets the speed specification of the USB 4.0, and the frequency f4 may the frequency of other USB specifications (other USB specifications that are lower than the USB 4.0) that is backward compatible (such as the frequency that meets the speed specification of the USB 3.2, the USB 3.1 Gen2 or the USB 3.1 Gen1). In some other embodiments, the frequency f3 meets the speed specification of the USB 3.2, and the frequency f4 may be the frequency of other USB specifications (other USB specifications that are lower than the USB 3.2) that is backward compatible (such as the frequency that meets the speed specification of the USB 3.1 Gen2 or the USB 3.1 Gen1). The first selection end and the second selection end of the multiplexing circuit 333 are respectively coupled to the output end of the frequency circuit 332a and the output end of the frequency circuit 332b. A common end of the multiplexing circuit 333 is coupled to the TX PHY circuit 351 to provide the clock signal CK2.

Figure 5:
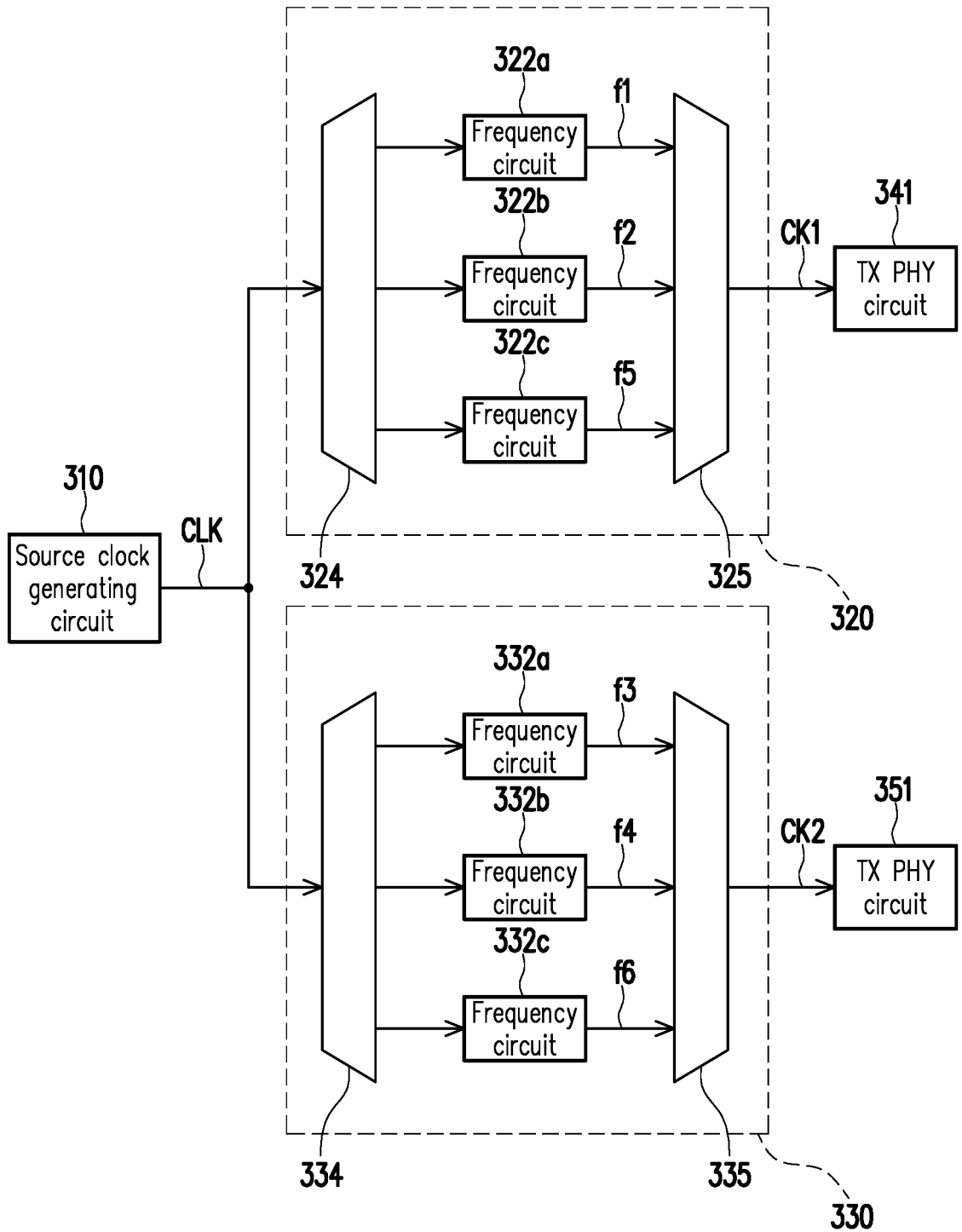
FIG. 5 is a schematic view of circuit blocks of a frequency adjusting circuit 320 and 330 according to another embodiment of the disclosure.

FIG. 5 is a schematic view of circuit blocks of a frequency adjusting circuit 320 and 330 according to another embodiment of the disclosure. The source clock generating circuit 310, the frequency adjusting circuit 320, the frequency adjusting circuit 330, the TX PHY circuit 341 and the TX PHY circuit 351 shown in FIG. 5 may be referred to the related description of the source clock generating circuit 310, the frequency adjusting circuit 320, the frequency adjusting circuit 330, the TX PHY circuit 341 and the TX PHY circuit 351 shown in FIG. 3, and, therefore, would not be described again herein.

The frequency adjusting circuit 320 shown in FIG. 5 includes a demultiplexing circuit 324, the frequency circuit 322a, the frequency circuit 322b, a frequency circuit 322c and a multiplexing circuit 325. A common end of the demultiplexing circuit 324 is coupled to the source clock generating circuit 310 to receive the source clock signal CLK. The input end of the frequency circuit 322a is coupled to a first selection end of the demultiplexing circuit 324, so as to receive the source clock signal CLK via the demultiplexing circuit 324. The output end of the frequency circuit 322a provides a first selection end of the multiplexing circuit 325 with the frequency f1. An input end of the frequency circuit 322b is coupled to a second selection end of the demultiplexing circuit 324, so as to receive the source clock signal CLK via the demultiplexing circuit 324. The output end of the frequency circuit 322b provides a second selection end of the multiplexing circuit 325 with the frequency f2 that is different from the frequency f1. The frequency circuit 322a and the frequency circuit 322b shown in FIG. 5 may be referred to the related description of the frequency circuit 322a and the frequency circuit 322b shown in FIG. 4, and, therefore, would not be described again herein.

An input end of the frequency circuit 322c is coupled to a third selection end of the demultiplexing circuit 324, so as to receive the source clock signal CLK via the demultiplexing circuit 324. An output end of the frequency circuit 322c provides a third selection end of the multiplexing circuit 325 with a frequency f5 that is different from the frequency f1 and the frequency f2. According to design requirements, in some embodiments, the frequency circuit 322c includes the frequency dividing circuit, so that the frequency f5 may be made smaller than the frequency of the source clock signal CLK. In some other embodiments, the frequency f5 may be equal to the frequency of the source clock signal CLK. In other embodiments, the frequency circuit 322c includes the frequency multiplying circuit, so that the frequency f5 may be made greater than the frequency of the source clock signal CLK.

According to design requirements, in some embodiments, the frequency f1 meets the speed specification of the USB 4.0, the frequency f2 meets the speed specification of the USB 3.2, and the frequency f5 may be the frequency of other USB specifications (other USB specifications that are lower than the USB 3.2) that is backward compatible (such as the frequency that meets the speed specification of the USB 3.1 Gen2 or the USB 3.1 Gen1). In some other embodiments, the frequency f1 meets the speed specification of the USB 4.0, the frequency f2 meets the speed specification of the USB 3.1 Gen2, and the frequency f5 may be the frequency of other USB specifications (other USB specifications that are lower than the USB 3.1 Gen 2) that is backward compatible (such as the frequency that meets the speed specification of the USB 3.1 Gen1). The first selection end, the second selection end and the third selection end of the multiplexing circuit 325 are respectively coupled to the output end of the frequency circuit 322a, the output end of the frequency circuit 322b and the output end of the frequency circuit 322c. A common end of the multiplexing circuit 325 is coupled to the TX PHY circuit 341 to provide the clock signal CK1.

The frequency adjusting circuit 330 shown in FIG. 5 includes a demultiplexing circuit 334, the frequency circuit 332a, the frequency circuit 332b, a frequency circuit 332c and a multiplexing circuit 335. A common end of the demultiplexing circuit 334 is coupled to the source clock generating circuit 310 to receive the source clock signal CLK. The input end of the frequency circuit 332a is coupled to a first selection end of the demultiplexing circuit 334, so as to receive the source clock signal CLK via the demultiplexing circuit 334. The output end of the frequency circuit 332a provides a first selection end of the multiplexing circuit 335 with the frequency f3. The input end of the frequency circuit 332b is coupled to a second selection end of the demultiplexing circuit 334, so as to receive the source clock signal CLK via the demultiplexing circuit 334. The output end of the frequency circuit 332b provides a second selection end of the multiplexing circuit 335 with the frequency f4 that is different from the frequency f3. The frequency circuit 332a and the frequency circuit 332b shown in FIG. 5 may be deduced by analogy through referring to the related description of the frequency circuit 332a and the frequency circuit 332b shown in FIG. 4 and, therefore, would not be described again herein.

An input end of the frequency circuit 332c is coupled to a third selection end of the demultiplexing circuit 334, so as to receive the source clock signal CLK via the demultiplexing signal 334. An output end of the frequency circuit 332c provides a third selection end of the multiplexing circuit 335 with a frequency f6 that is different from the frequency f3 and the frequency f4. According to design requirements, in some embodiments, the frequency circuit 332c includes the frequency dividing circuit, so that the frequency f6 may be made smaller than the frequency of the source clock signal CLK. In some other embodiments, the frequency f6 may be equal to the frequency of the source clock signal CLK. In other embodiments, the frequency circuit 332c includes the frequency multiplying circuit, so that the frequency f6 may be made greater than the frequency of the source clock signal CLK.

According to design requirements, in some embodiments, the frequency f3 meets the speed specification of the USB 4.0, the frequency f4 meets the speed specification of the USB 3.2, and the frequency f6 may be the frequency of other USB specifications (other USB specifications that are lower than the USB 3.2) that is backward compatible (such as the frequency that meets the speed specification of the USB 3.1 Gen2 or the USB 3.1 Gen1). In some other embodiments, the frequency f3 meets the speed specification of the USB 4.0, the frequency f4 meets the speed specification of the USB 3.1 Gen2, and the frequency f6 may be the frequency of other USB specifications (other USB specifications that are lower than the USB 3.1 Gen2) that is backward compatible (such as the frequency that meets the speed specification of the USB 3.1 Gen1). The first selection end, the second selection end and the third selection end of the multiplexing circuit 335 are respectively coupled to the output end of the frequency circuit 332a, the output end of the frequency circuit 332b, and the output end of the frequency circuit 332c. A common end of the multiplexing circuit 335 is coupled to the TX PHY circuit 351 to provide the clock signal CK2.

In conclusion, the USB IC 110 of the abovementioned embodiments has the USB port PHY circuit 340, the USB port 111a, the USB port PHY circuit 350, and the USB port 111b. The layout of the TX PHY circuit 341 of the USB port PHY circuit 340 and the layout of the TX PHY circuit 351 of the USB port PHY circuit 350 are disposed between the layout of the RX PHY circuit 342 of the USB port PHY circuit 340 and the layout of the RX PHY circuit 352 of the USB port PHY circuit 350, and/or the connecting component pair 361 of the USB port 111a and the connecting component pair 371 of the USB port 111b are disposed between the connecting component pair 362 of the USB port 111a and the connecting component pair 372 of the USB port 111b. Moreover, the TX PHY circuit 341 (the frequency adjusting circuit 320) and the TX PHY circuit 351 (the frequency adjusting circuit 330) share the same source clock generating circuit 310 to reduce the power consumption. The USB IC may provide a transmission port of high cost-effective planning.

Although the disclosure has been disclosed in the above embodiments, the embodiments are not intended to limit the disclosure, and those skilled in the art may make some modifications and refinements without departing from the spirit and scope of the disclosure. Therefore, the scope of the disclosure is defined by the claims attached below.

What is claimed is:

1. A USB integrated circuit comprising:
a first USB port, comprising a first connecting component pair serving as a first transmitting port and a second connecting component pair serving as a second receiving port, wherein the USB integrated circuit is disposed to output a first differential signal pair to outside via the first connecting component pair, and to receive a second differential signal pair from outside via the second connecting component pair; and
a second USB port, comprising a third connecting component pair serving as a third transmitting port and a fourth connecting component pair serving as a fourth receiving port, wherein the USB integrated circuit is disposed to output a third differential signal pair to outside via the third connecting component pair, and to receive a fourth differential signal pair from outside via the fourth connecting component pair;
wherein the first USB port further comprises:
a fifth connecting component pair, wherein the USB integrated circuit is disposed to send and receive a fifth differential signal pair via the fifth connecting component pair, and the fifth differential signal pair is a USB 2.0 data signal pair,
wherein the first connecting component pair serving as the first transmitting port and the second connecting component pair serving as the second receiving port are disposed between the fifth connecting component pair and the third connecting component pair, wherein the first connecting component pair serving as the first transmitting port is disposed between the second connecting component pair serving as the second receiving port and the third connecting component pair serving as the third transmitting port, and the third connecting component pair serving as the third transmitting port is disposed between the first connecting component pair serving as the first transmitting port and the fourth connecting component pair serving as the fourth receiving port.

2. The USB integrated circuit according to claim 1, wherein both the first connecting component pair serving as the first transmitting port and the third connecting component pair serving as the third transmitting port are disposed between the second connecting component pair serving as the second receiving port and the fourth connecting component pair serving as the fourth receiving port.

3. The USB integrated circuit according to claim 1, wherein the second USB port further comprises:
a sixth connecting component pair, wherein the USB integrated circuit is disposed to send and receive a sixth differential signal pair via the sixth connecting component pair, and the sixth differential signal pair is a USB 2.0 data signal pair;
wherein the third connecting component pair and the fourth connecting component pair are disposed between the sixth connecting component pair and the first connecting component pair.

4. A USB integrated circuit comprising:
a first USB port physical layer circuit, comprising a first transmitter physical layer circuit and a first receiver physical layer circuit, wherein the USB integrated circuit is disposed to output a first differential signal pair to outside via the first transmitter physical layer circuit, and to receive a second differential signal pair from outside via the first receiver physical layer circuit; and
a second USB port physical layer, comprising a second transmitter physical layer circuit and a second receiver physical layer circuit, wherein the USB integrated circuit is disposed to output a third differential signal pair to outside via the second transmitter physical layer circuit, and to receive a fourth differential signal pair from outside via the second receiver physical layer circuit;
wherein the first USB port physical layer circuit further comprises:
a first USB 2.0 physical layer circuit, wherein the USB integrated circuit is disposed to send and receive a fifth differential signal pair via the first USB 2.0 physical layer circuit, and the fifth differential signal pair is a first USB 2.0 data signal pair,
wherein the layout of the first transmitter physical layer circuit and the layout of the first receiver physical layer circuit are disposed between a layout of the first USB 2.0 physical layer circuit and the layout of the second transmitter physical layer circuit,
wherein a layout of the first transmitter physical layer circuit is disposed between a layout of the first receiver physical layer circuit and a layout of the second transmitter physical layer circuit, and the layout of the second transmitter physical layer circuit is disposed between the layout of the first transmitter physical layer circuit and a layout of the second receiver physical layer circuit.

5. The USB integrated circuit according to claim 4, wherein the layout of the first transmitter physical layer circuit and the layout of the second transmitter physical layer circuit are disposed between the layout of the first receiver physical layer circuit and the layout of the second receiver physical layer circuit.

6. The USB integrated circuit according to claim 4, wherein the second USB port physical layer further comprises:
a sixth second USB 2.0 physical layer circuit, wherein the USB integrated circuit is disposed to send and receive a sixth differential signal pair via the sixth second USB 2.0 physical layer circuit, and the sixth differential signal pair is a second USB 2.0 data signal pair;
wherein the layout of the second transmitter physical layer circuit and the layout of the second receiver physical layer circuit are disposed between a layout of the sixth second USB 2.0 physical layer circuit and the layout of the first transmitter physical layer circuit.

7. A USB integrated circuit comprising:
a source clock generating circuit disposed to generate a source clock signal;
a first frequency adjusting circuit, coupled to the source clock generating circuit to receive the source clock signal, disposed to optionally adjust a frequency of the source clock signal to generate a first clock signal;
a second frequency adjusting circuit, coupled to the source clock generating circuit to receive the source clock signal, disposed to optionally adjust the frequency of the source clock signal to generate a second clock signal;
a first USB port physical layer circuit, comprising a first transmitter physical layer circuit and a first receiver physical layer circuit, wherein the first transmitter physical layer circuit is coupled to the first frequency adjusting circuit to receive the first clock signal, and the USB integrated circuit is disposed to output a first differential signal pair to outside via the first transmitter physical layer circuit, and to receive a second differential signal pair from outside via the first receiver physical layer circuit; and
a second USB port physical layer circuit, comprising a second transmitter physical layer circuit and a second receiver physical layer circuit, wherein the second transmitter physical layer circuit is coupled to the second frequency adjusting circuit to receive the second clock signal, and the USB integrated circuit is disposed to output a third differential signal pair to outside via the second transmitter physical layer circuit, and to receive a fourth differential signal pair from outside via the second receiver physical layer circuit,
wherein the first USB port physical layer circuit further comprises:
a first USB 2.0 physical layer circuit, wherein the USB integrated circuit is disposed to send and receive a fifth differential signal pair via the first USB 2.0 physical layer circuit, and the fifth differential signal pair is a first USB 2.0 data signal pair;
wherein the layout of the first transmitter physical layer circuit and the layout of the first receiver physical layer circuit are disposed between a layout of the first USB 2.0 physical layer circuit and the layout of the second transmitter physical layer circuit.

8. The USB integrated circuit according to claim 7, wherein the first frequency adjusting circuit comprises:

a demultiplexing circuit, having a common end coupled to the source clock generating circuit to receive the source clock signal;

a first frequency circuit, having an input end coupled a first selection end of the demultiplexing circuit to receive the source clock signal, wherein an output end of the first frequency circuit provides a first frequency;

a second frequency circuit, having an input end coupled to a second selection end of the demultiplexing circuit to receive the source clock signal, wherein an output end of the second frequency circuit provides a second frequency that is different from the first frequency; and a multiplexing circuit, having a first selection end and a second selection end respectively coupled to the output end of the first frequency circuit and the output end of the second frequency circuit, wherein a common end of the multiplexing circuit is coupled to the first transmitter physical layer circuit to provide the first clock signal.

9. The USB integrated circuit according to claim 8, wherein the first frequency meets a speed specification of a USB 4.0, and the second frequency is a frequency of other USB specifications that is lower than the USB 4.0.

10. The USB integrated circuit according to claim 8, wherein the first frequency meets a speed specification of a USB 3.2 and the second frequency is a frequency of other USB specifications that is lower than the speed of the USB 3.2.

11. The USB integrated circuit according to claim 8, wherein the first frequency adjusting circuit further comprises:

a third frequency circuit, having an input end coupled to a third selection end of the demultiplexing circuit to receive the source clock signal, wherein an output end of the third frequency circuit provides a third selection end of the multiplexing circuit a third frequency that is different from the first frequency and the second frequency.

12. The USB integrated circuit according to claim 11, wherein the first frequency meets a speed specification of a USB 4.0, the second frequency meets a speed specification of a USB 3.2, and the third frequency is a frequency of other USB specifications that is lower than the USB 3.2.

13. The USB integrated circuit according to claim 11, wherein the first frequency meets a speed specification of a USB 4.0, the second frequency meets a speed specification of a USB 3.1 Gen2, and the third frequency is a frequency of other specifications that is lower than the USB 3.1 Gen2.

14. The USB integrated circuit according to claim 7, wherein the second frequency adjusting circuit comprises:

a demultiplexing circuit, having a common end coupled to the source clock generating circuit to receive the source clock signal;

a first frequency circuit, having an input end coupled to a first selection end of the demultiplexing circuit to receive the source clock signal, wherein an output end of the first frequency circuit provides a first frequency;

a second frequency circuit, having an input end coupled to a second selection end of the demultiplexing circuit to receive the source clock signal, wherein an output end of the second frequency circuit provides a second frequency that is different from the first frequency; and a multiplexing circuit, having a first selection end and a second selection end respectively coupled to the output end of the first frequency circuit and the output end of the second frequency circuit, wherein a common end of the multiplexing circuit is coupled to the second transmitter physical layer circuit to provide the second clock signal.

15. The USB integrated circuit according to claim 14, wherein the first frequency meets a speed specification of a USB 4.0, and the second frequency is a frequency of other USB specifications that is lower than the USB 4.0.

16. The USB integrated circuit according to claim 14, wherein the first frequency meets a speed specification of a USB 3.2, and the second frequency is a frequency of other USB specifications that is lower than the USB 3.2.

17. The USB integrated circuit according to claim 14, wherein the second frequency adjusting circuit further comprises:

a third frequency circuit, having an input end coupled to a third selection end of the demultiplexing circuit to receive the source clock signal, wherein an output end of the third frequency circuit provides a third selection end of the multiplexing circuit a third frequency that is different from the first frequency and the second frequency.

18. The USB integrated circuit according to claim 17, wherein the first frequency meets a speed specification of a USB 4.0, the second frequency meets a speed specification of a USB 3.2, and the third frequency is a frequency of other specifications that is lower than the USB 3.2.

19. The USB integrated circuit according to claim 17, wherein the first frequency meets a speed specification of a USB 4.0, the second frequency meets a speed specification of a USB 3.1 Gen2, and the third frequency is a frequency of other specifications that is lower than the USB 3.1 Gen2.

20. The USB integrated circuit according to claim 7, wherein the first transmitter physical layer circuit is disposed between the first receiver physical layer circuit and the second transmitter physical layer circuit, and the second transmitter physical layer circuit is disposed between the first transmitter physical layer circuit and the second receiver physical layer circuit.

* * * * *